Feb. 4, 1958  H. R. AXTELL  2,821,833
NUT HARVESTING DEVICE
Filed Feb. 1, 1957
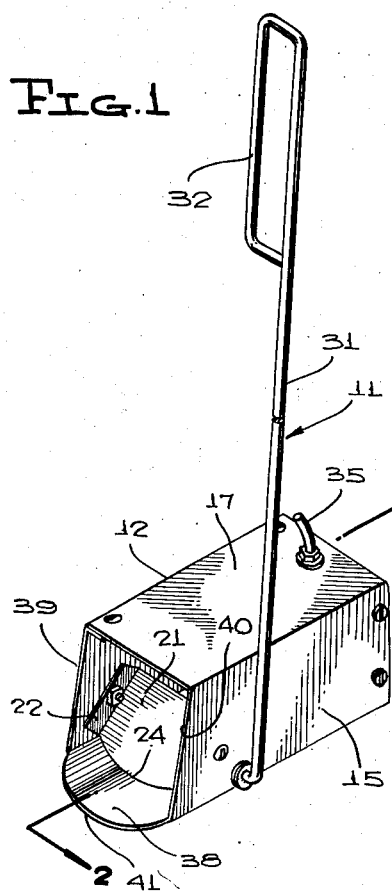
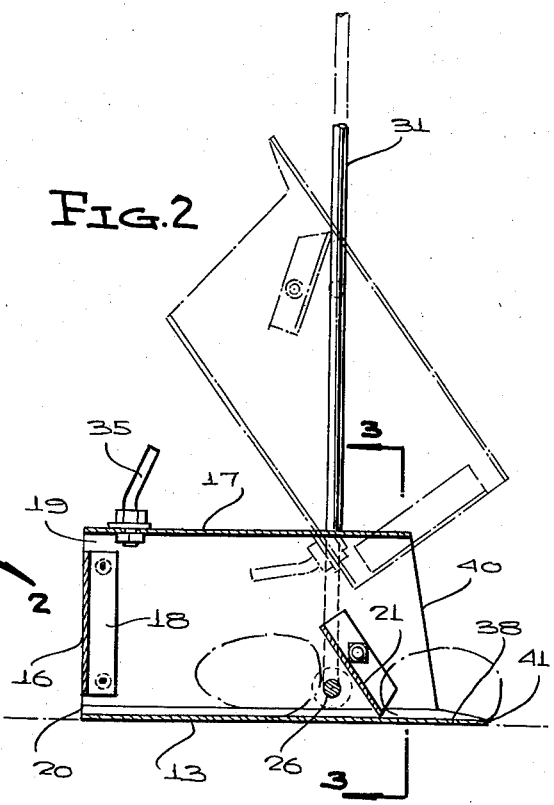
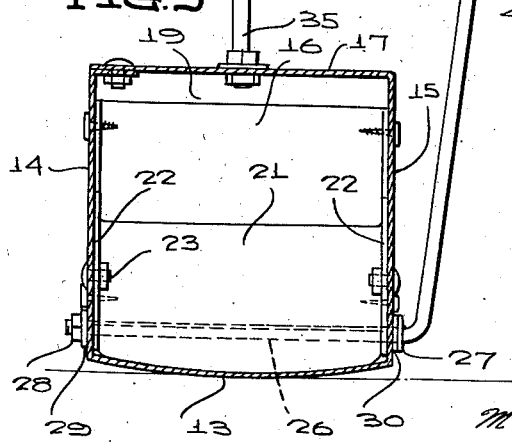
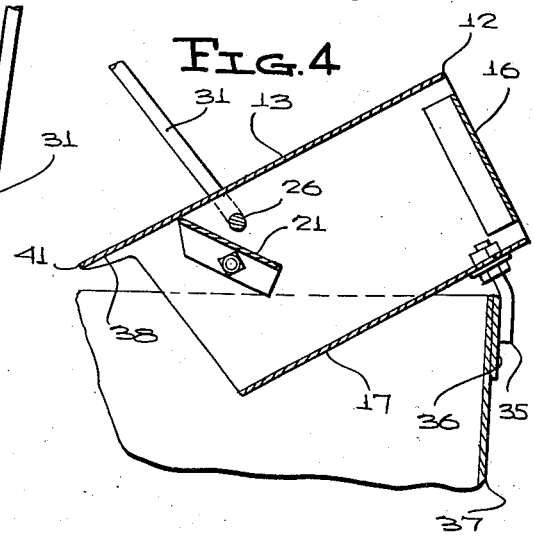
INVENTOR.
HARRY R. AXTELL
BY
McMorrow, Berman & Davidson
ATTORNEYS

United States Patent Office 2,821,833
Patented Feb. 4, 1958

2,821,833
NUT HARVESTING DEVICE

Harry R. Axtell, Madison, Miss.

Application February 1, 1957, Serial No. 637,778

4 Claims. (Cl. 56—328)

This invention relates to harvesting implements, and more particularly to a device for the collection of nuts, such as pecans, or other small objects.

A main object of the invention is to provide a novel and improved nut harvesting implement which is simple in construction, which may be operated by one hand, and which enables the user to rapidly and efficiently collect pecans or other small objects from the ground without including undesirable material, such as brush, trash, or the like.

A further object of the invention is to provide an improved nut harvesting implement which is inexpensive to manufacture, which is sturdy in construction, which is easy to empty, and which provides a considerable saving in time and labor in harvesting pecans, nuts or similar objects.

Further objects and advantages of the invention will become apparent from the following description and claims, and from the accompanying drawings, wherein:

Figure 1 is a fragmentary perspective view of an improved nut harvesting implement constructed in accordance with the present invention.

Figure 2 is an enlarged fragmentary longitudinal vertical cross sectional view taken on the line 2—2 of Figure 1.

Figure 3 is an enlarged fragmentary transverse vertical cross sectional view taken on the line 3—3 of Figure 2.

Figure 4 is a longitudinal vertical cross sectional view similar to Figure 2, but showing the main receptacle of the harvesting device in an inverted position over a collection container.

Referring to the drawings, and more particularly to Figure 1, 11 generally designates the improved harvesting implement of the present invention. The implement 11 comprises a generally rectangular rigid receptacle 12 having an open forward end and having a bottom wall 13, a pair of side walls 14 and 15, a rear end wall 16, and a top wall 17.

The rear end wall 16 comprises a suitable plate member whose height is substantially less than the interior height of the receptacle 12, the plate member having the vertical end flanges 18 which are secured to the end marginal portions of the side walls 14 and 15 with the member 16 substantially in an intermediate position, thereby defining the top and bottom slots 19 and 20 adjacent the top and bottom edges of the end wall member 16, as shown in Figure 2. Said slots are large enough to permit twigs, leaves, or other undesired materials to pass outwardly from the receptacle 12, but are sufficiently restricted to retain pecans or other similar objects in the container.

Designated at 21 is a transversely extending, upwardly and rearwardly inclined throat plate secured in the forward end of the receptacle and rising from the bottom wall 13 a substantial distance. The throat plate 21 is provided with the end flanges 22 which engage the inside surfaces of the side walls 14 and 15 and which are secured thereto by bolts 23. As shown, the throat plate 21 rises approximately one-half of the height of the receptacle, and is inclined at an angle of approximately 60 degrees from the horizontal. The angle of inclination of the throat plate is such that pecans or similar objects will pass upwardly over the throat plate and fall into the rear portion of the receptacle responsive to a scooping motion of the receptacle, and responsive to the elevation of the forward portion of the receptacle relative to the rear portion thereof, in a manner presently to be described.

As is clearly shown in Figure 3, the bottom wall 13 is bowed downwardly, so as to be outwardly convex. The bottom edge of the throat plate 21 is contoured to engage the concave surface of the bottom wall 13, as shown at 24.

A transverse pivot rod 26 extends rotatably through the lower forward portions of the side walls 14 and 15, rearwardly adjacent the throat plate 21, as is clearly shown in Figure 2, said pivot shaft having rigidly formed thereon a stop collar 27 adjacent the side wall 15, and being provided at its opposite end with a retaining nut 28 which engages a washer 29 disposed between said nut 28 and the side wall 14. A similar washer 30 is provided between the stop collar 27 and side wall 15, the tension of the nut 28 being insufficient to cause binding between washers 29, 30 and the side walls 14 and 15. Thus, the receptacle 12 is freely rotatable on the transverse shaft 26.

Integrally formed with the shaft 26 is the handle rod 31 which extends at an obtuse angle to the shaft 26, for example, at an angle of 105 degrees. The top portion of the handle rod 31 is formed with a generally rectangular handle loop 32, which serves as a gripping means whereby the user may support the container 12 for movement along the ground at one side of the user. The relatively large angle between the handle rod 31 and the pivot shaft 26 facilitates the sweeping movement of the container 12 along the ground since it enables the user to stand to one side of the objects to be picked up, providing better visibility and ease of operation of the device.

Since the nut 28 is removable, the position of the pivot shaft 26 may be readily reversed, so that the device may be used by either right or left-handed persons with equal facility.

Secured to the intermediate portion of the rear end margin of top wall 17 is an upwardly and forwardly inclined rod member 35 of sufficient length so that said rod member may be hooked over the top rim 36 of a receiving container 37 into which the harvested nuts are discharged.

In using the device, the receptacle 12 is moved along the ground, the nuts being engaged in the forward end portion of the receptacle on the forwardly extending portion of the bottom wall 13, shown at 38. Said extension 38 projects forwardly a substantial distance from the upwardly and rearwardly inclined forward edges 39 and 40 of the side walls 14 and 15, as shown in Figure 1, and the extension 38 is provided with an arcuately curved edge 41, as shown. The nuts are engaged on the extension 38, after which the handle rod 31 is somewhat elevated, to allow the receptacle 12 to swing clockwise around the pivot shaft 26, as viewed in Figure 1, whereby the nuts pass over the throat plate 21 into the rear portion of the receptacle. Further nuts may then be gathered in the same manner, until the receptacle contains a substantial quantity of nuts. The nuts may then be discharged into the main collection container 37 by engaging the hook-like projection 35 over the top rim of the receptacle 37 and applying sufficient force to invert the receptacle 12 to the position thereof shown in Figure 4, whereupon the nuts in the receptacle 12 slide downwardly along the wall 17 into the main collection container 37.

While a specific embodiment of an improved device for harvesting nuts has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for harvesting nuts comprising a generally rectangular rigid receptacle having an open forward end and having a bottom wall, a pair of side walls, a rear end wall and a top wall, a transversely extending, upwardly and rearwardly inclined throat plate secured in the forward end of said receptacle and rising from said bottom wall a substantial distance, the top edge of said throat plate being spaced below said top wall by a sufficient distance to allow nuts to pass between said top edge and said top wall into the space between said throat plate and rear wall and to allow the nuts to discharge from the receptacle when said receptacle is inverted, a transverse pivot rod extending rotatably through the lower forward portions of the side walls rearwardly adjacent said throat plate, and a handle rod rigidly secured to one end of said pivot rod and extending at a relatively large angle to said pivot rod, said receptacle being rotatable around said pivot rod to invert same.

2. A device for harvesting nuts comprising a generally rectangular rigid receptacle having an open forward end and having a bottom wall, a pair of side walls, a rear end wall, and a top wall, a forwardly projecting extension on said bottom wall, said extension having an arcuately curved edge, a transversely extending, upwardly and rearwardly inclined throat plate secured in the forward end of said receptacle and rising from said bottom wall a substantial distance, the top edge of said throat plate being spaced below said top wall by a sufficient distance to allow the nuts to pass between said top edge and said top wall into the space between said throat plate and rear wall and to allow the nuts to discharge from the receptacle when said receptacle is inverted, a transverse pivot rod extending rotatably through the lower forward portions of the side walls rearwardly adjacent said throat plate, and a handle rod rigidly secured to one end of said pivot rod and extending at a relatively large angle to said pivot rod, said receptacle being rotatable around said pivot rod to invert same.

3. A device for harvesting nuts comprising a generally rectangular rigid receptacle having an open forward end, and having a downwardly convex bottom wall, a pair of side walls, a rear end wall, and a top wall, a forwardly projecting extension on said bottom wall, said extension having an arcuately curved edge, a transversely extending upwardly and rearwardly inclined throat plate secured in the forward end of said receptacle and rising from said bottom wall a substantial distance, the top edge of said throat plate being spaced below said top wall by a sufficient distance to allow the nuts to pass between said top edge and said top wall into the space between said throat plate and rear wall and to allow the nuts to discharge from the receptacle when said receptacle is inverted, a transverse pivot rod extending rotatably through the lower forward portions of the side walls rearwardly adjacent said throat plate, and a handle rod rigidly secured to one end of said pivot rod and extending at an obtuse angle to said pivot rod said receptacle being rotatable around said pivot rod to invert same.

4. A device for harvesting nuts comprising a generally rectangular rigid receptacle having an open forward end and having a downwardly convex bottom wall, a pair of side walls, a rear end wall, and a top wall, a forwardly projecting extension on said bottom wall, said extension having an arcuately curved edge, a transversely extending, upwardly and rearwardly inclined throat plate secured in the forward end of said receptacle and rising from said bottom wall a substantial distance, the top edge of said throat plate being spaced below said top wall by a sufficient distance to allow the nuts to pass between said top edge and said top wall into the space between said throat plate and rear wall and to allow the nuts to discharge from the receptacle when said receptacle is inverted, a transverse pivot rod extending rotatably through the lower forward portions of the side walls rearwardly adjacent said throat plate, a handle rod rigidly secured to one end of said pivot rod and extending at an obtuse angle to said pivot rod, said receptacle being rotatable around said pivot rod to invert same, and an upwardly and forwardly inclined projection on the rear portion of said top wall for rotating the receptacle to an inverted position.

References Cited in the file of this patent

UNITED STATES PATENTS

| | | |
|---|---|---|
| 908,208 | Crawford | Dec. 29, 1908 |
| 2,695,488 | Harrison | Nov. 30, 1954 |